United States Patent [19]

Anselme et al.

[11] Patent Number: 5,066,402
[45] Date of Patent: Nov. 19, 1991

[54] METHOD OF CHANGING OPERATING MODES IN AUTOMATIC WATER FILTERING APPARATUS USING TUBULAR MEMBRANES

[75] Inventors: Christophe Anselme, Le Pecq; Loïc Daniel, Rueil-Malmaison, both of France

[73] Assignee: Lyonnaise Des Eaux-Dumez, Paris, France

[21] Appl. No.: 606,947

[22] Filed: Oct. 31, 1990

[30] Foreign Application Priority Data

Aug. 31, 1990 [FR] France .................................. 90 10864

[51] Int. Cl.⁵ ........................ B01D 61/20; B01D 29/66
[52] U.S. Cl. .................................... 210/636; 210/739;
210/791; 210/138; 210/321.87; 210/333.01;
210/333.1; 210/411
[58] Field of Search ............... 210/649, 739, 650, 791,
210/321.84, 636, 491, 497.1, 321.87, 321.88,
321.89, 321.9, 321.69, 138, 69, 90, 333.01, 333.1,
411

[56] References Cited

U.S. PATENT DOCUMENTS

| | | | |
|---|---|---|---|
| 4,482,461 | 11/1984 | Hindman et al. | 210/791 |
| 4,657,040 | 4/1987 | Torres | 210/136 |
| 4,844,804 | 7/1989 | Taylor | 210/321.89 |
| 4,921,610 | 5/1990 | Ford et al. | 210/321.69 |

FOREIGN PATENT DOCUMENTS

| | | | |
|---|---|---|---|
| 8911899 | 12/1989 | European Pat. Off. | 210/333.01 |
| 0058944 | 5/1979 | Japan | 210/636 |

Primary Examiner—W. Gary Jones
Assistant Examiner—Ana Fortuna
Attorney, Agent, or Firm—Amster, Rothstein & Ebenstein

[57] ABSTRACT

A method of changing operating modes in automatic water filtering apparatus comprising inside-skin tubular membrane modules for filtering water, the possible filtering modes being: dead-end filtering; cross-flow filtering; and cross-flow filtering with continuous purging; both cross-flow filtering modes including recirculation in a loop; wherein two types of triggering are provided for filter membrane backwashes, a first one of said types being related to time periods between two backwashes, which time periods are predetermined for each mode of filtering, and a second one of said types being related to reference values of an operating parameter of the automatic apparatus, which values are predetermined for each mode of filtering; with the mode of filtering being changed after a backwash has been triggered in response to one of the reference values, with changes taking place in the following order: dead-end filtering, cross-flow filtering, cross-flow filtering with continuous purging, or vice versa.

5 Claims, 1 Drawing Sheet

METHOD OF CHANGING OPERATING MODES IN AUTOMATIC WATER FILTERING APPARATUS USING TUBULAR MEMBRANES

The invention relates to a method of changing operating modes in automatic water filtering apparatus using tubular membranes.

BACKGROUND OF THE INVENTION

In installations that treat small to medium flow rates of water for distribution in the public drinking water mains network, it is particularly advantageous to treat the water by means of tubular membrane filters. Such installations must be capable of operating automatically and of providing filtered water in constant quantity and quality, regardless of variations in the quality of the source, and in spite of being made available to local authorities that do not have sufficient financial means to have qualified personnel in continuous attendance on such installations.

At present, three different filtering modes are known and in use with inside-skin tubular membranes:

(1) dead-end filtering where all of the water fed to the membranes passes through the membranes and is collected as a permeate (filtered water) from the periphery of the bundle of membranes. The flow rate at the axial outlet from the membranes is zero, and the membranes are cleaned periodically by backwashing whenever the thickness of the layer of matter in suspension as stopped by the membrane and as deposited thereon gives rise to a headloss which would increase pressure at constant flow rate to above an admissible threshold. The periodic backwashing has the purpose of removing this layer of deposited matter, and backwashing operations are triggered by automatic control means.

(2) cross-flow filtering, where only a portion of the water fed to the membranes passes through the membranes and is collected as a permeate, while the remainder is collected as a concentrate (i.e., non-filtered water) at the axial outlet from the membranes and is recirculated in a loop to the axial inlet of the membranes. Membrane cleaning is provided: firstly on a continuous basis by the water circulating over the membranes, thereby enabling a portion of the matter in suspension to be kept in suspension instead of being deposited on the membranes, and thus limiting cake thickness; and secondly by periodic backwashing.

(3) cross-flow filtering accompanied by continuous purging, using the above-described cross-flow filtering technique, where a portion of the unfiltered water including both the feed water and the concentrate is purged so as to limit the concentration of matter in suspension in the circuit.

Dead-end filtering is the most economic from the energy point of view since the flow rate of its single feed pump needs to be no greater than the flow rate of filtered water production. Cross-flow filtering requires an additional pump for recirculation; adding a continuous purge where water is returned to its source or to the drainage system is naturally even less economical.

In the event of the turbidity or the organic matter content of the feed water rising above the threshold at which good dead-end mode operation is possible, it must be possible to switch over to cross-flow mode filtering, and if the quality of the water becomes even worse, it will be necessary to be able to proceed with continuous purging. Conversely, if the quality of the water to be filtered is restored, then it is advantageous to be able to return to a more economical mode of operation.

At present, all three of these operating modes could be implemented in a single installation, with switching from dead-end mode to cross-flow mode being performed by switching on a recirculation pump, and with the addition of a purge being provided by opening an appropriate valve. The decision to change configuration would then be taken by the person responsible for supervision and as a function of the quality of the filtered water.

It would thus be advantageous to provide automatic switching from one mode to another without requiring human intervention.

SUMMARY OF THE INVENTION

The invention thus provides a method of changing operating modes in automatic water filtering apparatus comprising inside-skin tubular membrane modules for filtering water, the possible filtering modes being: dead-end filtering; cross-flow filtering; and cross-flow filtering with continuous purging of the water (including the feed water and the concentrate); both cross-flow filtering modes including recirculation in a loop. Two types of triggering are provided for filter membrane backwashes, the first type being related to time periods between two backwashes, which time periods are predetermined for each mode of filtering, and the second type being related to reference values of an operating parameter of the automatic apparatus, which reference values are predetermined for each mode of filtering. The mode of filtering is changed after a backwash has been triggered in response to one of the reference values, with changes taking place in the following order: dead-end filtering, cross-flow filtering, cross-flow filtering with continuous purging, or vice versa.

When at least one backwash is triggered in dead-end mode because an operating parameter of the apparatus has reached a first reference value rather than because a first predetermined time period has expired, operation switches automatically to cross-flow mode by switching on the recirculation loop, and when at least one backwash is triggered in cross-flow mode because a second reference value is reached rather than because a second predetermined time period has expired, operation switches automatically to cross-flow mode with purging by opening a purge valve on the recirculation loop.

It is advantageous, at least when passing to continuous purging, to omit switching over after the first backwash related to a reference value, and to switch over only after two backwashes related to the reference value have been triggered in a third predetermined time period which is less than the second predetermined time period. Conversely, in the event of the automatic control means observing that two or more consecutive backwashes are triggered during cross-flow filtering with continuous purging because the second predetermined time period has expired rather than because the reference value has been reached, then the system returns to cross-flow filtering mode without purging by closing the purge valve.

Such a return to the preceding operating mode may be provided between cross-flow mode and dead-end mode, for example in the event of the automatic control means observing that two or more consecutive backwashes have been triggered by the second predetermined time period expiring, when said second time period is not less than the first predetermined time period.

The operating parameter used by the automatic control means in conjunction with reference values must be related to the quality of the water to be treated. Examples include turbidity due to the quantity of matter in suspension, and transmembrane pressure which increases with increasing quantities of matter in suspension and of organic matter.

Using turbidity requires two experimental values to be determined for subsequent use as the reference values by testing the installation when it is put into service.

However, the parameter is advantageously the inlet pressure to the filter modules. This inlet pressure is related to the transmembrane pressure by the equation:

$$Ptm = \tfrac{1}{2}(Pe + Ps) - Pp$$

where:
Ptm = transmembrane pressure
Pe = inlet pressure to the module
Ps = outlet pressure from the module
Pp = permeate pressure (filtered water pressure)

For a given membrane, the maximum transmembrane pressure is the maximum pressure at which the membrane operates properly, and it is higher for cross-flow filtering than it is for dead-end filtering. Since the maximum inlet pressure to the module is related to the maximum transmembrane pressure by the equation:

$$Pe_{max} = Ptm_{max} + \tfrac{1}{2}\delta P + Pp$$

where $\delta P = Pe - Ps$ (longitudinal head loss), two reference values are available, with the lower one being associated with dead-end mode operation and with possible switching to cross-flow mode, and with the higher one being associated with cross-flow mode operation and with possible switching to cross-flow mode with purging.

Water filtering devices operate discontinuously depending on the demand for filtered water. Each time the water level in the reservoirs or tanks feeding the public network is high they are stopped, and they are started again only when the water level drops below a given value. Thus, when using membrane filtering, each time the filters are put into operation, filtering begins with dead-end filtering, and switching to the other two modes of filtering takes place only if the quality of the water deteriorates during filtering, e.g. due to thunderstorms or high levels of rainfall. Filter apparatus is generally dimensioned as a function of the most frequent quality of water to be treated so as to operate in the considerably cheaper dead-end mode.

The control method is described in greater detail below by means of an illustrative and non-limiting example.

BRIEF DESCRIPTION OF THE DRAWING

The above and related objects, features and advantages of the present invention will be more fully understood by reference to the following detailed description of the presently preferred, albeit illustrative, embodiments of the present invention, when taken in conjunction with the accompanying drawing showing a hydraulic circuit used in the practice of the present invention.

DETAILED DESCRIPTION OF THE PREFERRED EMBODIMENTS

Figure 1:
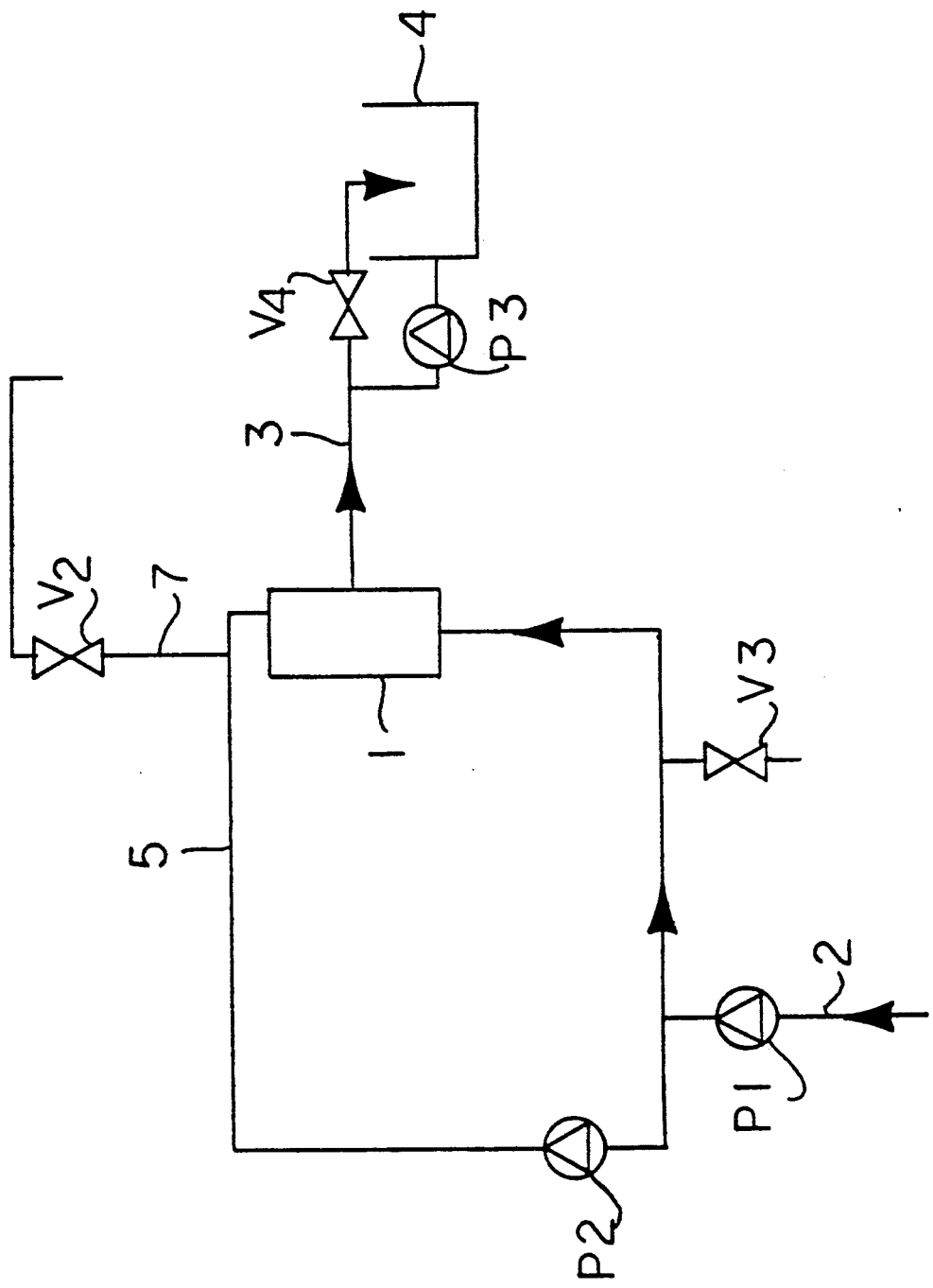

The method is implemented using a set of inside-skin filter membrane modules including a recirculation loop and a backwashing circuit, and also a continuous purge valve, all connected to enable the three above-described operating modes to be performed. Such dispositions are known to the person skilled in the art and include several variants whereby the modules may be fed with water to be filtered from the top and/or from the bottom. Until now, switching from one operating mode to another has been under manual control when it is observed that the quality of filtered water is not adequate.

The description starts from the apparatus being switched on again after production has been switched off for a period due to a lack of demand for water (full tanks).

The membranes are then fed by means of a feed pump, and the recirculation loop may optionally be used for allowing raw water to pass, but the recirculation pump is not switched on. Backwashes are triggered in conventional manner and automatically after a first predetermined time period which generally lies in the range 20 minutes to 24 hours depending on the quality of the water to be treated. This first time period $t_1$ is determined experimentally when the filter installation is initially put into operation. However, and in accordance with a preferred embodiment of the invention, apparatus is provided for measuring the inlet pressure to the membranes. This apparatus is connected to automatic control means for the automatic apparatus.

If the inlet pressure reaches a maximum value $p_1$ corresponding to a maximum transmembrane pressure for dead-end mode (the first reference value) before the time period $t_1$ has expired since the previous backwash, then the control means triggers backwashing, and at the end of backwashing it puts the recirculation loop into operation by switching on the recirculation pump. Filtering then continues in cross-flow mode. It may be advantageous to provide for the recirculation pump to be switched on only after two consecutive backwashes have been triggered by the first reference value within a period of time less than time period $t_1$.

In cross-flow mode, backwashes are normally triggered at the end of a second predetermined time period $t_2$ which is generally less than or equal to $t_1$. Further, in accordance with the invention, when the maximum inlet pressure $p_2$ corresponding to the maximum transmembrane pressure in cross-flow mode is reached (i.e. the second reference value), the control means triggers backwashing and, when the backwashing is completed, it optionally opens the purge valve. Here again it is advantageous for the control means to open the purge valve only after two backwashes have been triggered by the second reference value in a time period $t_3$ which is less than $t_2$. This prevents purging being switched on in the event of a deterioration in water quality of very short duration.

Since using the purge is particularly disadvantageous economically speaking, it is desirable to attempt to return to cross-flow filtering mode without purging. To do this, if the control means observes that n consecutive backwashes have been triggered at the expiry of a filter time period equal to $t_2$, then it closes the purge valve to return to cross-flow mode without purging. The value of n is chosen, e.g. empirically, as a function of the installation. If the quality of the water does not enable cross-flow mode on its own to be maintained, then backwashes are again triggered by reaching the second reference value and the control means will return to filtering with a purge.

If backwashes continue to be triggered by the time period $t_2$, then filtering continues in cross-flow mode.

It may then be appropriate to attempt to return to dead-end mode, e.g. after m consecutive backwashes have been triggered at the expiry of time period $t_2$ (where $m > n$).

The possibilities of returning to the preceding operating mode are determined on a case-by-case basis depending on expected variations in the quality of the water to be treated, on the production capacity of the installation, on the volume of the reservoir tank, etc. . . ., and also taking account of the fact that when production is stopped and after a backwash, the control means will restart the apparatus in dead-end filter mode.

The preferred operating cycle is summarized below.

| Backwashing triggered by | Filter mode |
| --- | --- |
| $t_1$ | dead-end |
| $p_1$ | dead-end |
| $p_1$ (twice running) | switch to cross-flow mode |
| $t_2$ | cross-flow |
| $p_2$ | cross-flow |
| $p_2$ (twice in less than $t_3$) | switch to cross-flow mode with purging |
| $p_2$ | cross-flow mode with purging |
| $t_2$ ($\underline{n}$ times) | return to cross-flow mode without purging |
| $t_2$ | cross-flow |
| $t_2$ ($\underline{m}$ times) | return to dead-end mode (optional) |
| $t_1$ | dead-end |
| where: $m > n$ | |
| $t_3 < t_2 \leq t_1$ | |

Referring now to the drawing, therein illustrated is a hydraulic circuit for use in the filtering process of the present invention. Raw water 2 is fed through the feeding pump $P_1$ in the module 1 containing filter membranes, and filtered water is drawn from the module 1 via the conduit 3 to a tank 4.

Backwashing is performed when needed by closing the valve $V_4$ and switching on the backwashing pump $P_3$, which withdraws some water from the tank 4 to inject it in the module 1 to backwash the filter membranes therein. The backwashing water is drained through duct 7 by opening valve $V_2$. This is merely an example, as backwashing may be performed with a liquid or a gas of any origin.

A recirculation loop 5 is provided for in the cross-flow filtering mode and includes a recirculating pump $P_2$ which, when switched on, recirculates the concentrate leaving the axial outlet of the membranes to the inlet thereof while raw water is being fed by $P_1$.

For continuous purging, the valve $V_2$ is opened and purges out of the circuit a part of the non-filtered water (a mixture of concentrate and feed water) circulating in the loop 5.

We claim:

1. A method of changing operating modes in automatic water filtering apparatus comprising inside-skin tubular membrane modules for filtering water, the possible filtering modes being: dead-end filtering, cross-flow filtering, and cross-flow filtering with continuous purging, both cross-flow filtering modes including recirculation in a loop; comprising the stages of
    (A) providing two types of triggering for filter membrane backwashes, a first one of said types being related to time periods between two backwashes, which time periods are predetermined for each mode of filtering, and a second one of said types being related to reference values of an operating parameter of the automatic apparatus, which reference values are predetermined for each mode of filtering; and
    (B) changing the mode of filtering after a backwash has been triggered in response to one of said reference values, with changes taking place in the following order: dead-end filtering, cross-flow filtering, cross-flow filtering with continuous purging, or vice versa.

2. A method according to claim 1, wherein switching from dead-end filtering mode to cross-flow filtering mode is performed by activating the loop to recirculate non-filtered water to the filter membranes after a backwash has been triggered at least once by reaching a first one of said reference values, and wherein switching to cross-flow filtering mode with continuous purging is performed by opening a valve for purging a part of the non-filtered water circulating in the loop after the time interval between two backwashes triggered by reaching a second one of said reference values has become less than a predetermined time period.

3. A method according to claim 2, wherein switching from cross-flow filtering mode with purging to cross-flow filtering mode without purging takes place when n consecutive backwashes have been triggered by reaching the end of the time period predetermined for cross-flow filtering, and switching from cross-flow filtering mode to dead-end filtering mode takes place when m consecutive backwashes have been triggered by reaching the end of the time period predetermined for cross-flow filtering, with $m > n$.

4. A method according to claim 1, wherein inlet pressures to the modules are used as said reference values, said inlet pressures corresponding respectively to maximum transmembrane pressure in dead-end filtering and to maximum transmembrane pressure in cross-flow filtering.

5. A method according to claim 1, wherein, upon stopping the operation of the modules, a backwashing is performed and, upon restarting the operation of the modules, the dead-end filtering mode is selected as the initial filtering mode.

* * * * *

UNITED STATES PATENT AND TRADEMARK OFFICE
CERTIFICATE OF CORRECTION

PATENT NO. : 5,066,402

DATED : November 19, 1991

INVENTOR(S) : Anselme, et al.

It is certified that error appears in the above-identified patent and that said Letters Patent is hereby corrected as shown below:

Title page, in the Abstract [73], at the end add

--and Degremont SA, Rueil - Malmaison, France--

Signed and Sealed this

Thirteenth Day of April, 1993

*Attest:*

STEPHEN G. KUNIN

*Attesting Officer*    *Acting Commissioner of Patents and Trademarks*